Figure 1:
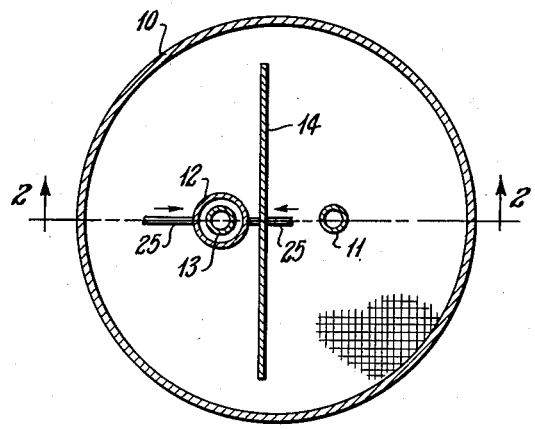

Sept. 29, 1959 K. A. HARPER 2,906,609
CATALYST REGENERATOR
Filed Oct. 12, 1953 2 Sheets-Sheet 1

INVENTOR.
K. A. Harper
BY
Hudson & Young
ATTORNEYS

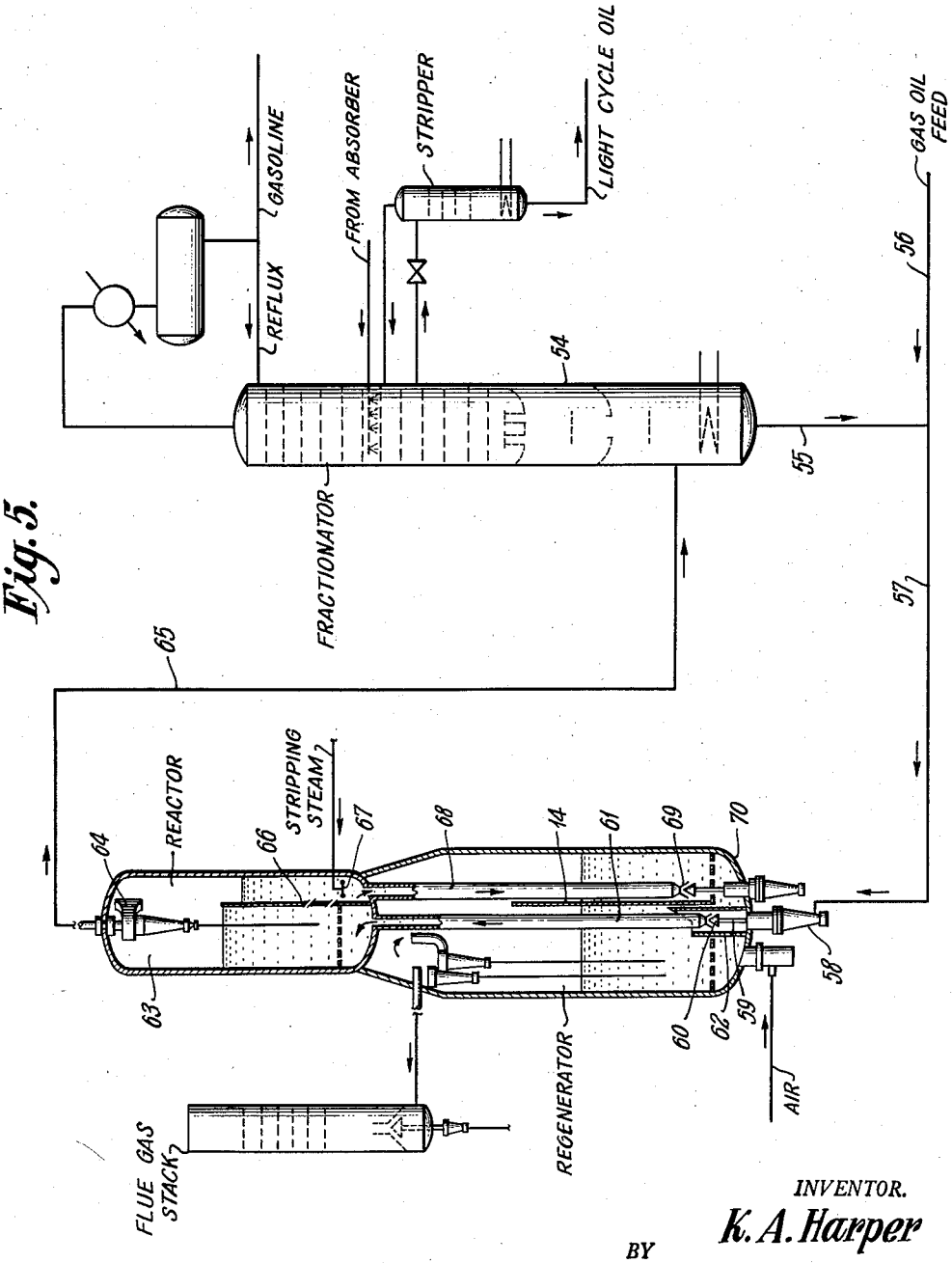

2,906,609

CATALYST REGENERATOR

Kenneth A. Harper, Bartlesville, Okla., assignor to Phillips Petroleum Company, a corporation of Delaware Application October 12, 1953, Serial No. 385,485

8 Claims. (Cl. 23—288)

This invention relates to the regeneration of catalysts, or contact masses, in the so-called fluidized state. In one of its aspects the invention relates to and provides a regenerator design or construction which comprises a baffle system ensuring that substantially each portion of the mass is uniformly regenerated while passing through the regenerator.

In certain types of regenerators, which have been employed, the fluidized catalyst is introduced into the regenerator rather near to the place from which it is removed from the regenerator. Thus, in one operation the inlet and outlet points for catalyst to be regenerated and regenerated catalyst have been positioned about five feet apart and substantially at the same level. It has been unavoidable that a portion of the catalyst, which can be different as to its character from other portions of the catalyst, as fluidizing conditions vary within the regenerator, and throughout the unit, for example, an oil conversion unit, of which the regenerator is a part, passes into the outlet from the regenerator before said catalyst is desirably or sufficiently regenerated while other portions of said catalyst are, perhaps, undesirably long in remaining in the regenerator and are, therefore, subjected to too much heat or too long to the regeneration conditions prevailing therein.

I have found that a desirably uniform residence time of the catalyst, within the regenerator vessel, can be accomplished by providing means which prevent a, so to speak, straight line flow thereof from the inlet to the outlet points of the regenerator vessel. I have found that, when the inlet and outlet of the regenerator vessel are placed at substantially the same level, it is desirable to cause the catalyst mass to travel a substantially horizontal path for a substantial distance thus to avoid direct or straight line flow of the same between the inlet and the outlet of the vessel as well as to avoid, importantly, that the catalyst be immediately carried over the said means by the upwardly moving regenerator gases.

The means provided according to this invention comprises a baffle or partition element, of a special design, which is positioned between said inlet and outlet for catalyst entering and leaving the regenerator at substantially the same level.

The employ of baffles of various kinds to direct flow of fluids in various ways is known to engineers. However, the specific construction provided as a result of my concept of invention is believed to be patentably novel because it provides an unsuggested, highly desirable flow of catalyst within the regenerator, all the while accomplishing an improved regeneration as will be more fully elucidated hereinafter.

Figure 2:
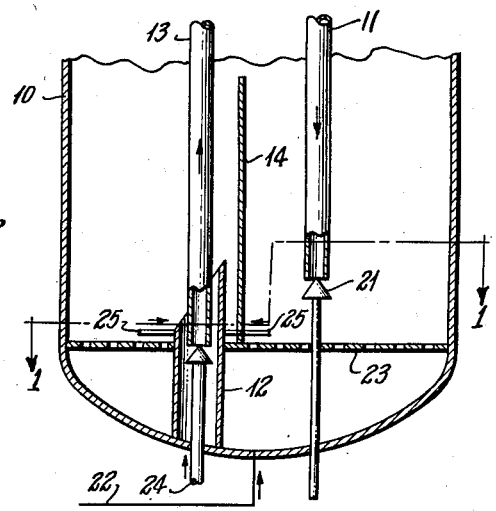
Figure 3:
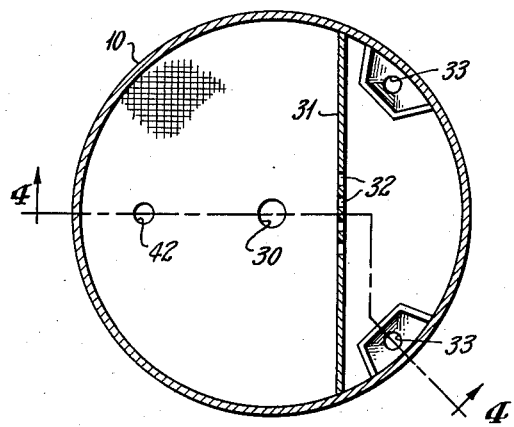
Figure 4:
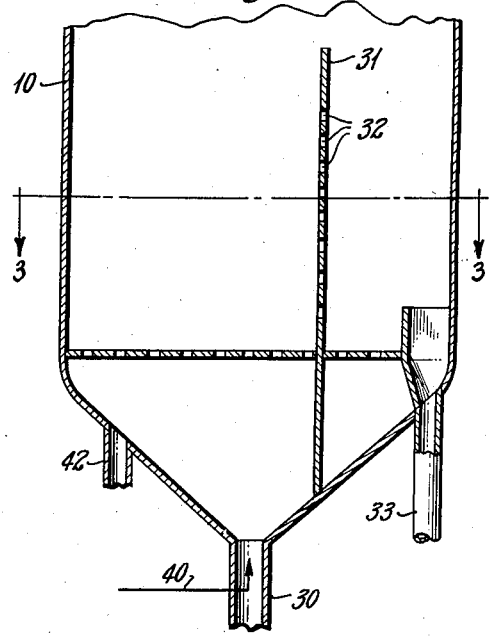

In the drawings Figure 1 is a horizontal cross section showing in simplified manner a lower portion of a substantially cylindrical, vertically disposed regenerator vessel, having a baffle member disposed between the inlet and outlet for catalyst or contact mass. Figure 2 is an elevational cross section of the apparatus of Figure 1 and shows catalyst inlet, the baffle, a regenerated catalyst well and an outlet for regenerated catalyst. Figure 3 shows a horizontal cross sectional view of a somewhat different regenerator design embodying a different baffle construction, and Figure 4 shows an elevational cross section of the vessel of Figure 3. In the vessel of Figures 3 and 4 the regenerator is equipped with a catalyst drawoff provided to remove a portion of catalyst for cooling of the same and its recycle to the regenerator, thus to control the temperature of the regeneration. Figure 5 shows diagrammatically the positioning of a regenerator, according to the invention, in a unit especially adapted to the conversion, say, cracking, of a hydrocarbon.

Referring now to Figure 1, 10 is a regenerator vessel down into which spent catalyst is admitted through pipe 11. The spent catalyst, which is in fluidized condition, is maintained in dense phase in the bottom portion of the vessel 10. Being fluidized, the catalyst migrates around the ends of baffle 14, from the right-hand side of the vessel to the left-hand side of the vessel and ultimately collects in regenerated catalyst well 12, from which it is removed through regenerated catalyst outlet pipe 13, as more fully described in connection with Figure 2 hereof. In the operation of the regenerator, according to Figure 1, it is sufficient to note now that while catalyst can not pass directly from pipe 11 to well 12 and out through pipe 13, because of the positioning of baffle or partition 14, it can flow in an uninterrupted manner around the ends of baffle 14. Thus, while gases for regeneration and gases resulting from regeneration are passing generally in an upwardly direction, the catalyst is travelling substantially horizontally around the ends of baffle 14. Thus, according to the invention, the catalyst will take longer to go around the baffle of the regenerator than it would to pass over the top of a baffle, which would extend all the way to the wall 10. Obviously, with the catalyst flowing concurrently with the gases within the regenerator, the catalyst will travel faster than it will when it is flowing horizontally and the gases are flowing upwardly.

It will be noted that in Figure 1 and in Figure 2 the regeneration gases which are introduced at the bottom of the regenerator vessel pass generally in an upwardly direction while the catalyst passes around the ends of baffle 14. Thus, the flow of catalyst with respect to the flow of regeneration gases is substantially transverse at all times.

In Figure 2, spent catalyst from a reaction vessel disposed above the regenerator vessel (see Figure 5) passes downwardly through 11 and valve 21 into the right-hand side of vessel 10. Regenerating gas, which is an oxidizing gas, having an oxygen concentration of the order of about 10 percent, is fed to the bottom of regenerator 10 by way of pipe 22. The regenerator gas rises upwardly through perforated grid 23, causing regeneration of the catalyst. The catalyst migrates around the ends of baffle element 14 and ultimately some of it collects in regenerated catalyst well 12, from which it is removed by oil vapor feed, which enters the regenerated catalyst well through pipe 24. Regenerated catalyst and oil feed pass upwardly through pipe 13 into the overhead reaction vessel (see Figure 5). If desired, steam or other stripping fluid can be introduced through pipes 25 into regenerated catalyst well 12 to strip any or substantially all of combustion gases which may be accompanying the catalyst as it passes into the well 12.

While Figures 1 and 2 have been described in connection with an operation in which spent catalyst flows downwardly to a point within the regenerator vessel and is removed from another point within the regenerator vessel in an upwardly direction, it is believed clear to one skilled in the art that the spent catalyst can equally well be introduced to the same point in the regenerator vessel from a point below the said vessel and in similar manner removed from a point of removal in the vessel in a downwardly direction and that, as far as the positioning of the regenerator vessel with respect to the reactor vessel, in which the catalyst is employed is concerned, the invention, in respect of the type and positioning of the baffle member 14, is unaltered. Thus, while the apparatus in Figures 1 and 2 is illustrated in a combination in Figure 5, it is clear that it is equally applicable in a combination in which the regenerator vessel is located either alongside of or above a reactor vessel.

Thus, while the invention is especially adapted for use in connection with the type of operation which is exemplified in Figure 5, it is not intended in this disclosure to limit the invention only to such use.

In Figure 3, vessel 10 is equipped with a spent catalyst inlet or riser 30, through which spent catalyst along with regenerating gases rises up into a bed of fluidized catalyst maintained at the bottom of vessel 10. The level of catalyst gradually builds up until, in operation, catalyst overflows through one or more apertures 32 in element or baffle 31, over into the right-hand side of the vessel 10. Baffle 31 in this modification extends to the sides of the vessel 10. Thus, the catalyst perforce must travel to the level of the opening 32, before it can pass over to the other side of the vessel and down through the catalyst withdrawal or outlets 33. Positioning the apertures, such as 32, as viewed in Figure 3, away from a line drawn from spent catalyst riser 30 to either of regenerated catalyst withdrawals 33, it is possible, as in connection with the description of Figures 1 and 2, to cause the catalyst to travel horizontally while the gases are rising upwardly. Although the catalyst will rise on the left-hand side of baffle 31 and will descend on the right-hand side of baffle 31, it is clear that in traveling to and from the partition it will have a horizontal travel component.

In Figure 4 gas introduced through pipe 40, which can be a regenerating gas containing oxygen, comingles with spent catalyst rising through spent catalyst riser 30 into regenerator vessel 10. As described in connection with Figure 3, the catalyst rises upwardly and then through baffle 31, by means of apertures 32, and ultimately downwardly through withdrawal pipe 33. Some of the catalyst withdrawn through pipe 33 is passed through cooling means, not shown, and recycled into vessel 10 by means of recycle riser 42 to provide for cooling of the catalyst and thus to avoid overheating thereof during regeneration.

Referring now to Figure 5, in which there is shown an oil conversion unit, in which unit an oil vapor is subjected to an elevated temperature in the presence of a catalyst, adapted to convert the same to lower molecular weight products, such as gasoline, a gas oil feed is passed by way of conduit 56 together with gas oil from conduit 55 by means of conduit 57 into valve 58, in which adjustable pipe 59 terminating at its upper extremity in bored valve plug member 60, is located. Hot catalyst surrounding pipe 59 passes some heat into the oil which is already near its vaporization temperature and when the oil passes from member 60 into pipe 61, it comes into contact with catalyst introduced from regenerated catalyst well 62, which insures its complete vaporization. A pressure drop at this point aids in the desirable vaporization of the oil. The pressure in the regenerator at the riser inlet is greater than the pressure in the reaction chamber, thus effecting the flow of regenerated catalyst from the catalyst well 62 into and through pipe 61. The oil vapors and catalyst pass up through pipe 61 into reactor chamber 63. Oil vapors are converted in the left-hand section of reactor 63 and pass out through the top thereof through cyclone 64 and pipe 65, and finally enter fractionator 54, wherein the converted oil vapors are fractionally separated into gasoline, light cycle oil, and gas oil which can be returned through pipes 55 and 57, as described. During operation, some catalyst passes through partition member 66, is stripped with steam at 67 and passes down through pipe 68 through valve 69 into the regenerator chamber 70. As shown in the drawing, the partition or baffle member 14 of Figures 1 and 2, or in the alternative, not shown, the baffle member 31 of Figures 3 and 4, serves to prevent insufficiently regenerated catalyst from entering into the regenerated catalyst well, as described in connection with Figures 1–4, inclusive.

It is well-known that catalyst containing the lowest amount of carbon thereon produces the least amount of coke and that higher octane gasoline is produced when employing catalyst having the least amount of carbon thereon. Further, at constant cracking intensity highest conversions are realized when the catalyst contains the least amount of carbon thereon.

The employ of the baffle means of my invention permits the attainment of lower average amounts of carbon per catalyst particle than have been heretofore obtained in the type of regeneration to which the said means is adapted.

Reasonable variation and modification are possible within the scope of the foregoing disclosure and the appended claims to the invention, the essence of which is that a method and an apparatus have been provided wherein the regeneration of a fluidized bed of contact mass or catalyst is accomplished in a regeneration zone, to which and from which catalyst or contact mass is passed at substantially the same level and caused to travel in said zone a substantial horizontal distance away from a straight line drawn between the inlet and the outlet of said catalyst.

I claim:

1. In a regenerator vessel, adapted to regenerate with regeneration gases a contact mass consisting of a fluidized bed of a mass of particulate solids, said vessel having an inlet and an outlet for said regeneration gases, said inlet for gases being substantially below said outlet for said gases, an inlet for said contact mass to be regenerated, an outlet for regenerated contact mass, wherein said inlet for said mass and said outlet for said mass are located in proximity to each other in a lower section of the vessel and therefore below the normally maintained surface of the bed of said fluidized contact mass and above the inlet for said gases, the improvement comprising, in combination with said vessel a substantially vertically disposed upwardly extending partition member located between said inlet for said mass and outlet for said mass and extending from a level below said inlet for said mass and said outlet for said mass, such that no contact mass can pass thereunder, to a level substantially above the said inlet for said mass and said outlet for said mass and therefore above the normally maintained surface of said bed of fluidized contact mass, across said vessel, and terminating each of its ends at a distance from the side wall of said vessel to provide for divided contact mass flow horizontally around said partition member from said inlet for said mass to said outlet for said mass, thus, ensuring a uniform and sufficient residence time within said vessel of each portion of said contact mass by avoiding direct flow of any of said mass from said inlet for said mass to said outlet for said mass.

2. A regenerator according to claim 1, wherein said partition is perforated at a level substantially above said inlet and said outlet.

3. In a regenerator vessel adapted to regenerate with regeneration gases a contact mass consisting of a fluidized bed of a mass of particulate solids, said vessel having an inlet and an outlet for said regeneration gases, said inlet for gases being substantially below said outlet for said gases, an inlet for said contact mass to be regenerated, an outlet for regenerated contact mass, wherein said inlet for said mass and said outlet for said mass are located in proximity to each other in a lower section of the vessel and therefore below the normally maintained surface of the bed of said fluidized contact mass and above the inlet for said gases, the improvement comprising, in combination with said vessel a substantially vertically disposed upwardly extending partition member located between said inlet for said mass and said outlet for said mass, extending from the bottom of said vessel to a level substantially above the said inlet for said mass and said outlet for said mass and therefore above the normally maintained surface of said bed of fluidized contact mass, across said vessel from wall to wall, said partition being perforated at a level below the normally maintained surface of said bed of fluidized contact mass but substantially above the level of said inlet for said mass and said outlet for said mass, the perforation being substantially removed horizontally from a straight line drawn from said inlet for said mass to said outlet for said mass, the perforations being so made and located in said partition as to cause the mass to travel across the plane of said partition substantially horizontally and as a plurality of streams.

4. A regenerator according to claim 3, wherein the said inlet is substantially centrally located in said vessel, said outlet is peripherally located in said vessel and said perforation is substantially horizontally removed from a straight line between said inlet and said outlet when viewed in plan-view.

5. A regenerator according to claim 3, wherein a contact mass recycle inlet is provided on the same side of the partition with the said inlet for contact mass to be regenerated.

6. A regenerator vessel comprising essentially an inlet and an outlet for regeneration gases, the inlet for said gases being below a bed of contact mass in said vessel, and the outlet for said gases being above said bed, an inlet for fluidized contact mass to be regenerated therein, and an outlet for regenerated contact mass, said inlet for the mass and said outlet for the mass being located substantially at the same level below the normally maintained surface of said bed, a partition member extending across said vessel between said inlet and said outlet for contact mass and above the normally maintained level of said bed, said partition member being shaped to prevent straight line flow between said inlet for said mass and said outlet for said mass but to provide a plurality of passageways for passage of the contact mass in a substantially horizontal manner from said inlet for contact mass to said outlet for contact mass, said passageways being removed horizontally from a straight line between said inlet and said outlet for said contact mass, thereby causing said mass to travel as sub-divided streams across the plane of said partition horizontally away from a straight line between said inlet for said mass and said outlet for said mass.

7. In a substantially vertically disposed substantially cylindrical regeneration tower, an inlet for regeneration gases at the foot of said tower, an outlet for spent regeneration gases at the upper end of said tower, inlet means for introducing fluidized contact mass and its fluidizing medium into the lower portion of said tower in which a bed of contact mass is maintained, outlet means for removing contact mass from said tower at a lower portion thereof located substantially at the same level as said inlet means, a substantially vertically disposed partition extending substantially across the tower and so situated in the bottom portion of said cylindrical tower as to bar straight line flow of contact mass between said inlet means and said outlet means and extending from the bottom of said tower so that contact mass cannot pass thereunder to a level above said bed, said partition being perforated, with the perforations out of straight line flow between said inlet means and said outlet means and so as to cause a uniform and sufficient residence time within said vessel of each portion of said contact mass by causing the same to flow as sub-divided streams through the perforations in said partition.

8. A regenerator according to claim 2 wherein the perforation is substantially horizontally removed from a straight line between said inlet and said outlet for contact mass when viewed in plan view.

References Cited in the file of this patent

UNITED STATES PATENTS

| | | |
|---|---|---|
| 2,419,245 | Arverson | Apr. 22, 1947 |
| 2,490,986 | Symonds | Dec. 13, 1949 |
| 2,492,948 | Berger | Jan. 3, 1950 |
| 2,521,195 | Wheeler | Sept. 5, 1950 |
| 2,538,235 | Coffey | Jan. 16, 1951 |
| 2,539,263 | Munday | Jan. 23, 1951 |
| 2,604,384 | Border et al. | July 22, 1952 |
| 2,628,157 | Kuhn | Feb. 10, 1953 |
| 2,631,927 | Trainer et al. | Mar. 17, 1953 |
| 2,671,102 | Jewell | Mar. 2, 1954 |
| 2,686,710 | Jewell | Aug. 17, 1954 |
| 2,690,962 | Clarke | Oct. 5, 1954 |